B. MORAHAN.
Brush Holder.
No. 2,750. Reissued Aug. 20, 1867.
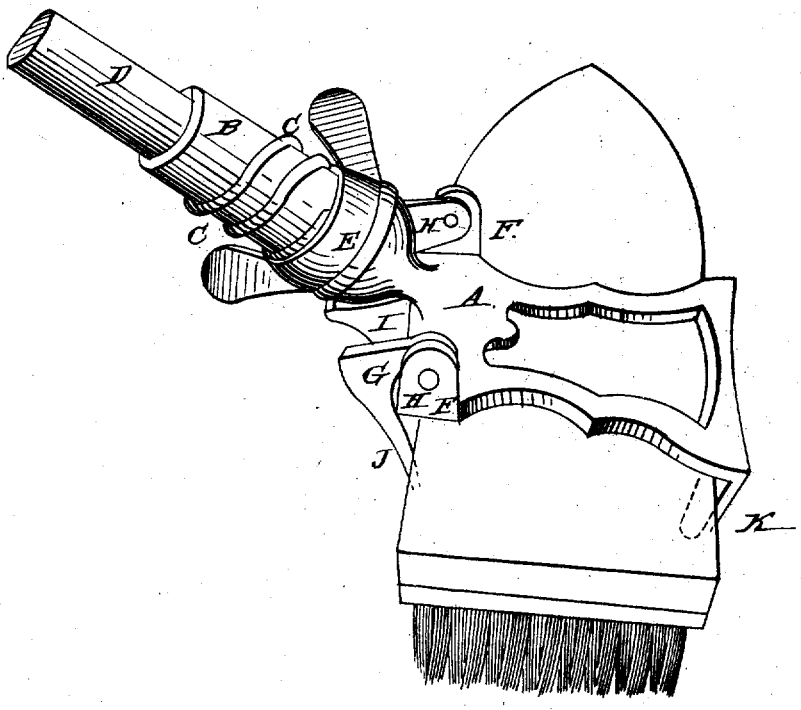
WITNESSES:
James Sangster
S. McC. Sangster
INVENTOR:
Bernard Morahan
N. PETERS, Photo-Lithographer, Washington, D. C.

United States Patent Office.

BERNARD MORAHAN, OF BROOKLYN, NEW YORK.

*Letters Patent No.* 66,612, *dated July* 9, 1867; *reissue No.* 2,750, *dated August* 20, 1867.

IMPROVED BRUSH-HOLDER.

The Schedule referred to in these Letters Patent and making part of the same.

TO ALL WHOM IT MAY CONCERN:

Be it known that I, BERNARD MORAHAN, of the city of Brooklyn, in the county of Kings, and in the State of New York, have invented a new and improved Device for Holding Brushes; and do hereby declare that the following is a full, clear, and exact description thereof, reference being had to the accompanying drawings, and to the letters of reference marked thereon.

The nature of my invention consists in an adjustable holder for brushes, the same being constructed with a hinged or pivoted jaw or clamp, and made adjustable by means of a screw, or any other equivalent device, so that the pivoted jaw may be made to expand or contract, as the size of the brush may require, and so that it may be fastened to brushes of different sizes, the object being to obviate the necessity of getting down upon the knees in the act of scrubbing, or to be used for purposes out of the reach of ordinary scrubbing-brushes.

To enable others skilled in the art to make and use my invention, I will proceed with the description of its construction and operation by reference to the accompanying drawings, which represent a convenient method of constructing and arranging my invention.

A, in the said drawings, represents the frame of a clamping device. B the socket, which is cast in one piece with it, into which a handle may be fitted, as shown at D, of any required length. Upon the said socket B is cast a screw-thread or worm, as shown at C C. E is a screw-nut, arranged to work over the screw or worm C C, as shown. F F represent two ears, which project upward from the frame A, to form hinge supports for the clamping jaw. G represents a clamping jaw, which swings upon the joints H H. I represents a piece projecting from the centre of said clamp. J and K represent a part of the device which clamps or binds against the brush when tightened up. They may be provided with sharp points or pins, which may be forced into the brush when the clamp is tightened up, if necessary.

I construct my clamping device of metal, malleable iron being the cheapest and best, although other materials may be used. Its operation is clearly and plainly shown in the drawings, which represent a perspective view of the same complete, with a brush fastened in place. The releasing of the brush, as will be readily seen, is accomplished by turning the thumb-screw E, the lower part of which bears against the projecting piece I on the movable clamp G. It is also tightened by the same means.

What I claim as my invention, and desire to secure by Letters Patent, is—

The frame A or its equivalent, in combination with a hinged or pivoted jaw or the equivalent thereof, so arranged as to expand or contract, as the size of the brush may require, for the purposes herein shown and described.

BERNARD MORAHAN.

Witnesses:

JAMES SANGSTER,

S. M. SANGSTER.